(12) United States Patent
Cassara' et al.

(10) Patent No.: US 7,792,953 B2
(45) Date of Patent: Sep. 7, 2010

(54) COMPUTERIZED SYSTEM FOR REMOTE DIAGNOSTICS AND CONFIGURATION ON A FIELD DEVICE

(75) Inventors: Salvatore Cassara', Como (IT); Roberto Vanini, Lenno-Como (IT); Antonio Ferraro, Lenno (IT)

(73) Assignee: ABB S.p.A., Milan (IT)

( * ) Notice: Subject to any disclaimer, the term of this patent is extended or adjusted under 35 U.S.C. 154(b) by 792 days.

(21) Appl. No.: 10/451,657

(22) PCT Filed: Dec. 14, 2001

(86) PCT No.: PCT/EP01/14984

§ 371 (c)(1), (2), (4) Date: Dec. 4, 2003

(87) PCT Pub. No.: WO02/054162

PCT Pub. Date: Jul. 11, 2002

(65) Prior Publication Data

US 2005/0216099 A1   Sep. 29, 2005

(30) Foreign Application Priority Data

Dec. 28, 2000 (IT) .......................... MI2000A2851

(51) Int. Cl.
*G06F 15/173* (2006.01)
*G06F 15/177* (2006.01)
*G06F 11/00* (2006.01)

(52) U.S. Cl. ..................... 709/224; 709/220; 702/188

(58) Field of Classification Search ................ 709/224, 709/220, 221; 702/188
See application file for complete search history.

(56) References Cited

U.S. PATENT DOCUMENTS

| 5,311,562 A | | 5/1994 | Palusamy et al. | |
|---|---|---|---|---|
| 5,980,078 A | * | 11/1999 | Krivoshein et al. | 700/1 |
| 6,014,612 A | * | 1/2000 | Larson et al. | 702/183 |

(Continued)

FOREIGN PATENT DOCUMENTS

DE    10007972    10/2000

(Continued)

*Primary Examiner*—Larry Donaghue
*Assistant Examiner*—Brian J Gillis
(74) *Attorney, Agent, or Firm*—Connolly Bove Lodge & Hutz LLP

(57) ABSTRACT

A computerized system for performing remote diagnostics and configuration operations of a field device with a control unit includes a first communications module suitable to automatically handle the remote exchange of data/information with a remote station through a first communications network; and a second communications module, linked to the first communications module and suitable to automatically handle the exchange of data/information with the control unit of the field device by virtue of a second communications network. A third communications module suitable to automatically handle the remote exchange of data/information with the first communications module is connected through the first communications network. A first diagnostics and configuration module is linked to the third communications module and is suitable to remotely and automatically handle diagnostic operations and/or configuration operations on the control into the field device.

12 Claims, 1 Drawing Sheet

U.S. PATENT DOCUMENTS

| | | | |
|---|---|---|---|
| 6,023,507 A * | 2/2000 | Wookey | 709/224 |
| 6,098,116 A | 8/2000 | Nixon et al. | |
| 6,145,001 A * | 11/2000 | Scholl et al. | 709/223 |
| 6,212,581 B1 * | 4/2001 | Graf | 710/18 |
| 6,229,787 B1 * | 5/2001 | Byrne | 370/218 |
| 6,317,701 B1 * | 11/2001 | Pyotsia et al. | 702/188 |
| 6,330,597 B2 * | 12/2001 | Collin et al. | 709/220 |
| 6,393,380 B1 * | 5/2002 | Zemlo | 702/188 |
| 6,857,013 B2 * | 2/2005 | Ramberg et al. | 709/223 |

FOREIGN PATENT DOCUMENTS

| | | |
|---|---|---|
| EP | 0927933 A2 | 7/1999 |
| EP | 0965897 A1 | 12/1999 |

* cited by examiner

COMPUTERIZED SYSTEM FOR REMOTE DIAGNOSTICS AND CONFIGURATION ON A FIELD DEVICE

BACKGROUND

The present invention relates to a computerized system for performing remote diagnostics and configuration operations on a field device. More particularly, the present invention relates to a computerized system that allows to manage remotely, automatically and with improved features, the operating life of a field device, installed in an industrial system.

It is known that a field device, such as for example a pressure transmitter, temperature transmitter, and the like, is used in an industrial system to measure process values (pressure, temperature and the like). A field device generally comprises an electronic control unit for adjusting the operation of the device itself and for handling the communication of the field device with external electronic devices.

It is known that very often a field device, after installation in an industrial system, has to be subjected to interventions aimed at ensuring adequate management of its operating life in order to ensure optimum performance thereof.

Diagnostics operations are often performed with the aim of acquiring characteristic data/parameters of the field device, whose processing can lead to the identification of a fault or malfunction. Moreover, if necessary the diagnostics operations are accompanied by configuration operations aimed at modifying/improving the setup of the field device in order to solve a fault or modify/improve the performance of said device, according to the requirements. In practice, the diagnostics operations consist in providing the control unit of the device with data/commands to detect certain physical values of interest, while the configuration operations consist in configuring the software/firmware of the control unit so as to modify/improve the operating setup of the field device.

Conventional methods for performing operations for the diagnostics and configuration of a field device generally involve direct intervention on the industrial system in which the field device is installed. Very often these operations are performed by means of the user interface of the control unit of the field device or by virtue of appropriately provided computerized devices that can be connected directly to the control unit of the field device, such as a handheld device or portable computer. Diagnostics and intervention operations are often performed by unspecialized personnel of the user, i.e., the user of the field device, who receives, in order to solve known problems, remote assistance, e.g. by fax, telephone, e-mail, et cetera from the supplier.

Alternatively, the user can send the field device directly to the headquarters of the supplier, who performs the required intervention.

Instead, in order to solve more complicated problems, the user can request the field intervention of specialized personnel of the supplier or can acquire specialized personnel, for example trained by the supplier, for maintenance of the field device.

The conventional methods for performing diagnostics and configuration operations on a field device have drawbacks.

Practical experience has shown that very often the interventions performed by unspecialized user personnel are not conclusive, owing to the relatively limited knowledge of the operation of the field device. Remote assistance on the part of the supplier, performed with conventional methods, is highly laborious, since misunderstandings or misinterpretations between the customer and the suppliers can occur often. These problems can arise for example from shortcomings related to the information describing the problem on the part of the customer or from incorrect interpretations of that information by the supplier. Obviously, avoiding these problems sometimes requires considerable coordination efforts that cause intervention on the field device to be relatively costly in terms of times and expense.

However, practice has shown that the intervention of specialized supplier personnel directly on the field is very often highly expensive for the user, since the field device is often installed far from the supplier's headquarters. Likewise, it is costly for the user to train and use specialized personnel to be used permanently for the maintenance of installed field devices, especially if the number of these field devices is not particularly large.

SUMMARY

The aim of the present invention is to provide a computerized system for performing diagnostics and configuration operations on a field device that allows to perform remotely and automatically configuration and diagnostics operations on a field device, overcoming the above described drawbacks.

Within the scope of this aim, an object of the present invention is to provide a computerized system for performing diagnostics and configuration on a field device that allows the supplier, upon simple request by the user, to perform remotely and automatically the diagnostics and configuration operations on a field device in a substantially autonomous manner.

Another object of the present invention is to provide a computerized system for performing diagnostics and configuration on a field device that allows the supplier to perform remotely and automatically diagnostics configuration operations on a field device, even on a periodic basis.

Another object of the present invention is to provide a computerized system for performing diagnostics and configuration on a field device that allows the supplier to share/exchange with the customer, remotely and automatically, information/data related to the management of the operating life of the field device.

Another object of the present invention is to provide a computerized system for performing diagnostics and configuration on a field device that allows the supplier to direct/guide remotely the client in performing particularly complicated diagnostics and configuration operations.

Another object of the present invention is to provide a computerized system for performing diagnostics and configuration on a field device that is highly reliable, relatively simple to provide, and at modest costs.

This aim and these and other objects that will become apparent hereinafter are achieved by a computerized system for performing the remote diagnostics and configuration of a field device that comprises a control unit. The computerized system according to the present invention comprises first computerized means connected to a first communications network and to a second communications network. Said first computerized means comprise a first communications module suitable to automatically handle the remote exchange of data/information with a remote station, by virtue of said first communications network, and a second communications module, linked to said first communications module and suitable to automatically handle the exchange of data/information with the control unit of said field device by virtue of said second communications network. The computerized system according to the present invention furthermore comprises second computerized means, which are put into communication with said first computerized means by virtue of said first communications network and comprise a third communications module suitable to automatically handle the remote exchange of data/information with said first communications module.

The computerized system according to the present invention is characterized in that said second computerized means comprise a first diagnostics and configuration module, which is linked to said third communications module and is suitable to remotely and automatically handle, by virtue of said third communications module and said first computerized means, diagnostics operations and/or configuration operations on said field device.

BRIEF DESCRIPTION OF THE DRAWING

Further characteristics and advantages will become apparent in the following description, which describes some preferred but not exclusive embodiments of the computerized system, with particular reference to FIG. 1, which is a schematic view of the structure of the computerized system according to the present invention.

Figure 1:
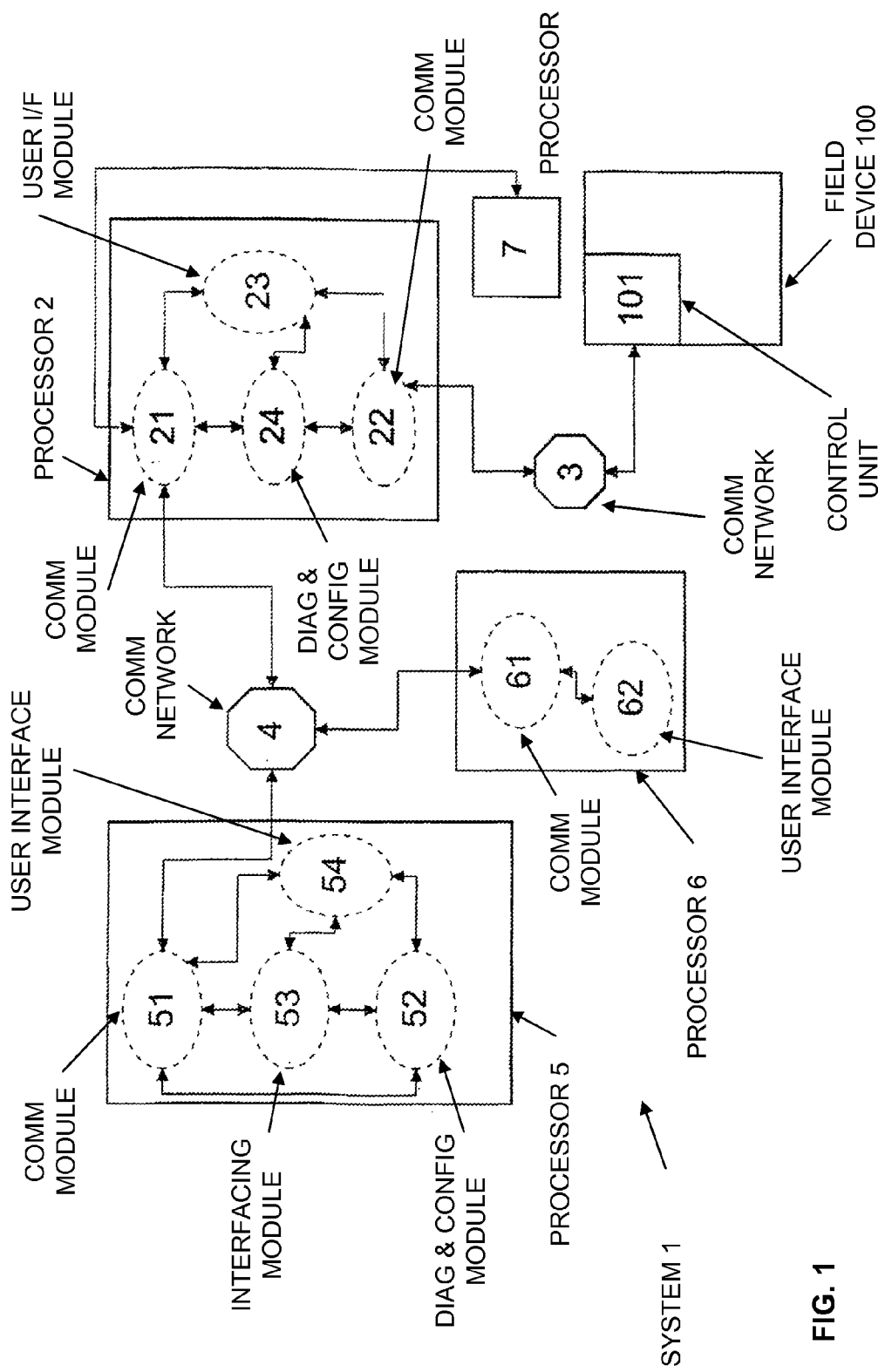
With reference to FIG. 1, the computerized system according to the present invention, generally designated by the reference numeral 1, is used to perform the remote configuration and diagnostics of a field device 100 provided with a control unit 101. The computerized system 1 comprises first computerized means 2, which comprise for example a first appropriately configured computer, linked to a first communications network 4 and to a second communications network 3. The first computerized means 2 are connected to the control unit 101 by virtue of a second communications network 3.

The second communications network 3 can be advantageously a field communications network capable of implementing known instrument communications protocols, such as for example HART or FIELDBUS communications protocols.

The first computerized means 2 comprise a first communications module 21, which comprises for example a first modem, suitable to handle automatically the remote exchange of data/information with a remote station, by virtue of the first communications network 4. The first communications network 4 can be constituted by the Internet communications network and/or by a telephone and/or satellite communications network.

Furthermore, the first computerized means 2 comprise a second communications module 22, which comprises for example a second modem, that is connected to the first communications module 21. The second communications module 22 is suitable to automatically handle the exchange of data/information with the control unit 101 of the field device 100. This can occur by virtue of a standard interface (COM1 or RS232 interface) or by means of a proprietary interface, typically a FIELDBUS interface.

The first computerized means 2 can be located nearby (particularly if a HART communications protocol is used) or remotely with respect to the field device 100 (particularly if a FIELDBUS communications protocol is used).

The computerized system 1 furthermore comprises second computerized means 5, which comprise for example a second appropriately configured computer, linked to the first computerized means 2 by virtue of the first communications network 4. Advantageously, furthermore, the second computerized means 5 and the first computerized means 2 are linked so as to constitute an architecture of the client-server type. It is therefore possible to easily implement known communications protocols, for example of the TCP/IP type. The second computerized means 5 comprise a third communications module 51, which comprises for example a third modem, that is suitable to automatically handle the remote exchange of data/information with the first communications module 21.

The particularity of the computerized system 1 according to the present invention consists of the fact that the second computerized means 5 comprise a first diagnostics and configuration module 52 that is linked to said third communications module 51. The first diagnostics and configuration module 52 remotely and automatically manages, by virtue of the third communications module 51 and the first computerized means 2, diagnostics operations and/or configuration operations on the control unit 101 of the field device 100.

The diagnostics operations can comprise, for example, the acquisition and processing of data regarding physical values and/or parameters related to the operation of the field device 100 and/or the acquisition and processing of data regarding physical values and/or parameters related to the execution of tests on the control unit 101. In practice, the diagnostics operations relate to the acquisition of data/parameters regarding the operating life of the field device 100 both in operating conditions and during the execution of predefined tests. Likewise, the configuration operations can comprise the acquisition and/or processing and/or sending of data/commands related to the corresponding operating configuration of the control unit 101. The configuration operations can therefore relate to the acquisition, processing and installation of data/commands suitable to determine the operating setup of the field device 100.

The computerized system according to the present invention has an architecture that allows to implement highly advantageous processes for performing the remote configuration and diagnostics of the field device 100.

For example, the customer can activate the first computerized means 2, which by means of the first communications module 21 can send an intervention request to the second computerized means 5, more specifically, to the third communications module 51. Once the request for intervention has been received by the third communications module 51, the first diagnostics and configuration module can activate a standard diagnostics and configuration procedure, which can be performed automatically directly on the control unit 101. It should be noted that the execution of the diagnostics and configuration operations does not require direct intervention of the customer (who can simply submit the request of intervention) but can be performed fully by the first diagnostics and configuration module 52, which is capable of accessing remotely and automatically the control unit 101 of the field device 100.

Advantageously, the computerized system 1 comprises third computerized means 6, which comprise for example a third appropriately configured computer, which are remotely linked to the second computerized means 5 by virtue of the first communications network 4, as shown in FIG. 1, or of a third communications network (not shown).

The third communications network also can be the Internet communications network and/or a telephone and/or satellite communications network.

The third computerized means 6 preferably comprise a fourth communications module 61, which comprises for example a fourth modem, suitable to handle automatically the remote exchange of data/information with the third communications module 51.

According to a particularly preferred embodiment, the second computerized means 5 comprises an interfacing module 53 that can be accessed by the first computerized means 2 (by virtue of the first communications module 21 and the third communications module 51) and the third computerized means 6. The interfacing module 53 preferably comprises a plurality of resources, for example databases, application programs, et cetera, that can be shared by the first computerized means 2 and by the third computerized means 6. Advantageously, furthermore, the first computerized means 2 and/or the second computerized means 5 and/or the third computerized means 6 can respectively comprise user interface modules 23, 54 and 62. This architecture of the computerized system 1 according to the present invention is particularly advantageous, since it allows to perform remotely even complicated diagnostics and configuration operations. By using the interfacing module 53, the user (who accesses the first computerized means 2) and the supplier (who accesses the third computerized means 6) can in fact use a common platform for data sharing. In this manner the supplier can easily communicate remotely with the client, who in turn can follow step by step the configuration and diagnostics operations performed by the supplier.

Advantageously, the first computerized means 2 comprise a second diagnostics and configuration module 24, which is connected to the first communications module 21 and the second communications module 22. The second diagnostics and configuration module 24 is suitable to support the first diagnostics and configuration module 52 during diagnostics operations and/or configuration operations on the field device 100. For example, the second diagnostics and configuration module 24 can be used to "adapt" the commands sent by the first diagnostics and configuration module 52 to the communications protocol of the field device 100. In order to perform its supporting action in the best possible manner, the first diagnostics and configuration module 52 interacts advantageously with the second diagnostics and configuration module 24, according to a master-slave mode. Thus, for example, the second diagnostics and configuration module 24 can receive a first packet of commands on the part of the first diagnostics and configuration module 52 and "adapt" this first packet of commands into a second packet of commands that can be executed directly by the field device 100 (by performing, for example, procedures for compression or compilation or the like).

According to a preferred embodiment, the computerized system 1 according to the present invention advantageously comprises fourth computerized means 7 which are connected to the first communications module 21. The fourth computerized means advantageously comprise auxiliary computerized devices, for example Webcam devices or the like connected to appropriate modems, suitable to support remotely the execution of manual testing operations by the user on the field device 100. This solution is particularly advantageous, since it allows the supplier to control/guide remotely the correct installation of the field device 100 or to direct/control the customer in performing field tests. This allows the customer to drastically limit the need for the intervention of specialized support personnel on the part of the supplier.

In practice it has been found that the computerized system according to the present invention allows to achieve the intended aim and objects.

The computerized system 1 allows, by virtue of the first, second and third computerized means, to perform remotely and in an automated manner the diagnostics and configuration operations on a field device in a substantially autonomous manner. In this manner, management of the operating life of the field device 100 can be performed by expert personnel without the need for continuous field interventions, at the same time limiting the need for a considerable coordination effort in order to avoid errors and misunderstandings. Furthermore, with relatively modest efforts (both economic and in terms of time) on the part of the customer the supplier can perform continuous monitoring of the operating conditions of the field device and schedule periodic maintenance operations, intervening preemptively before a fault or malfunction occurs. The maintenance operations can be performed automatically, by reconfiguring appropriately the field device.

If required, by using the fourth computerized means 7 the supplier is able to direct/guide remotely the customer in performing particularly complicated diagnostics and configuration operations.

By virtue of the interfacing module 53, the supplier and the customer can easily share/exchange with the customer, remotely and in an automated manner, information/data regarding the management of the operating life of the field device.

Finally, it has been found that the computerized system 1 according to the present invention can be produced easily and at competitive costs. It is in fact relatively easy to implement practically, since it uses in practice a network of computers (provided appropriately) and field communications networks and/or the Internet and/or telephone networks and/or satellite networks.

The computerized system according to the present invention thus conceived is susceptible of numerous modifications and variations, all of which are within the scope of the inventive concept.

All the details may furthermore be replaced with other technically equivalent elements.

The invention claimed is:

1. A computerized system for performing remote diagnostics and configuration operations of a field device for measuring process values, which comprises a control unit, said computerized system comprising:

first computerized means comprising a first computer, connected to a first communications network and to a second communications network that is functionally distinct from said first communications network and which implements an instrument communications protocol for connecting said first computerized means with the control unit of said field device, said first computerized means further comprising:

a first communications module suitable to automatically handle the remote exchange of data/information with a remote station through said first communications network; and a second communications module, linked to said first communications module and suitable to automatically handle the exchange of data/information with the control unit of said field device through said second communications network;

second computerized means comprising a second computer, connected to said first computerized means and comprising a third communications module suitable to automatically handle the remote exchange of data/information with said first communications module by means of said first communications network;

wherein said second computerized means further comprises a first diagnostics and configuration module, linked to said third communications module and suitable to remotely and automatically handle, using said third communications module and said first computerized means, diagnostics operations and/or configuration operations on the control unit of said field device;

third-computerized means comprising a third computer that is remotely linked to said second computerized means and further comprises a fourth communications module suitable to handle automatically the remote exchange of data/information with said first diagnostics and configuration module, through said first communications network or through a third communications network;

wherein said second computerized means comprise an interfacing module that can be accessed by said first computerized means and by said third computerized means, said interfacing module comprising a plurality of resources that can be shared by said first computerized means and by said third computerized means;

wherein said shared plurality of resources establishes a common platform for data sharing which is used by said first computerized means and/or said third computerized means for performing configuration and diagnostic operations;

wherein said common platform allows a first user, who accesses said second computerized means, to check upon request by a second user, a configuration or a diagnostics operation performed on the control unit of the field device by the second user.

2. The computerized system according to claim 1, wherein said first computerized means comprise a second diagnostics and configuration module connected to said first communications module and said second communications module, said second diagnostics and configuration module being suitable to support said first diagnostics and configuration module during diagnostics operations and/or configuration operations on the control unit of said field device.

3. The computerized system according to claim 2, wherein said first diagnostics and configuration module interacts with said second diagnostics and configuration module according to a master-slave mode.

4. The computerized system according to claim 3, wherein said first communications network and/or said third communications network is an Internet communications network.

5. The computerized system according to claim 2, wherein said first communications network and/or said third communications network is an Internet communications network.

6. The computerized system according to claim 2, wherein said first communications network and/or said third communications network is a telephone and/or satellite communications network.

7. The computerized system according to claim 1, wherein said first communications network and/or said third communications network is an Internet communications network.

8. The computerized system according to claim 1, wherein said first communications network and/or said third communications network is a telephone and/or satellite communications network.

9. The computerized system according to claim 1, wherein said second communications network is a field communications network.

10. The computerized system according to claim 1, further comprising fourth computerized means that are suitable to support remotely the execution of manual testing operations on the control unit of said field device.

11. The computerized system according to claim 1, wherein said diagnostics operations comprise:
   the acquisition and processing of data regarding physical values and/or parameters related to the operation of said field device; and/or
   the acquisition and processing of data regarding physical values and/or parameters related to the execution of tests on said field device.

12. The computerized system according to claim 1, wherein said configuration operations comprise the acquisition and/or processing and/or sending of data/commands related to the operating configuration of the control unit of said field device.

* * * * *